Dec. 22, 1953    O. PARKER    2,663,422
EGG WEIGHING AND GRADING APPARATUS
Filed Oct. 17, 1950    3 Sheets-Sheet 1

INVENTOR.
ORVAL PARKER
BY Sellers & Latta
Attorneys

Dec. 22, 1953  O. PARKER  2,663,422
EGG WEIGHING AND GRADING APPARATUS
Filed Oct. 17, 1950  3 Sheets-Sheet 2
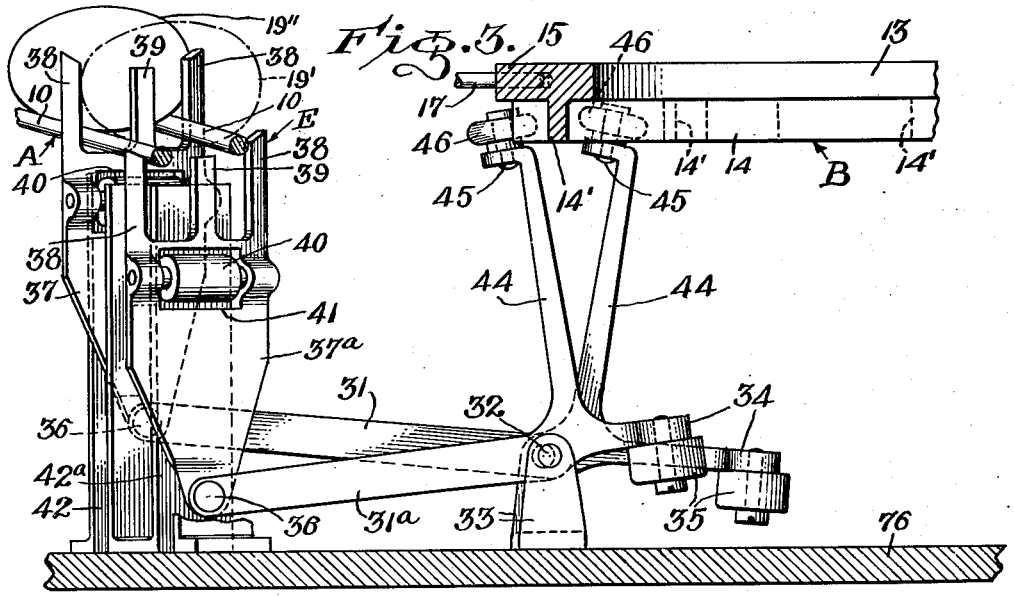
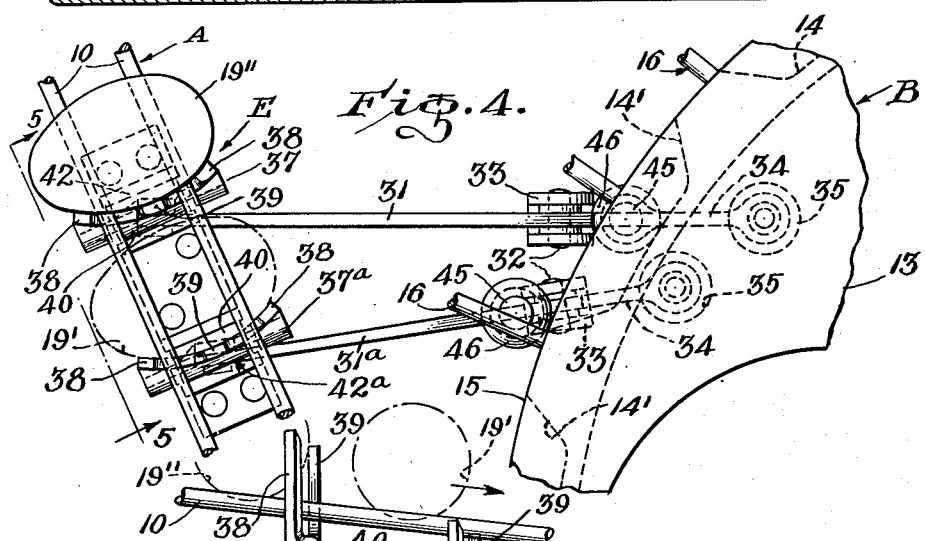
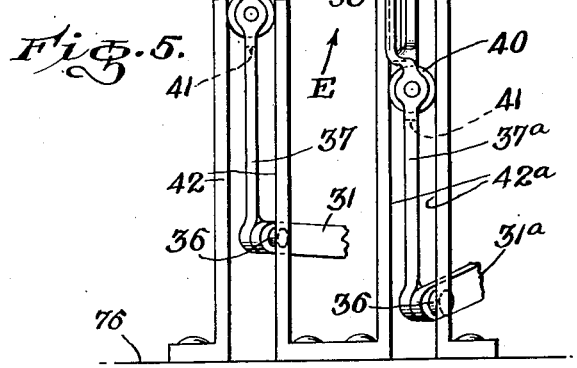
INVENTOR.
ORVAL PARKER
BY Sellers & Latta
Attorneys Dec. 22, 1953  O. PARKER  2,663,422
EGG WEIGHING AND GRADING APPARATUS
Filed Oct. 17, 1950  3 Sheets-Sheet 3
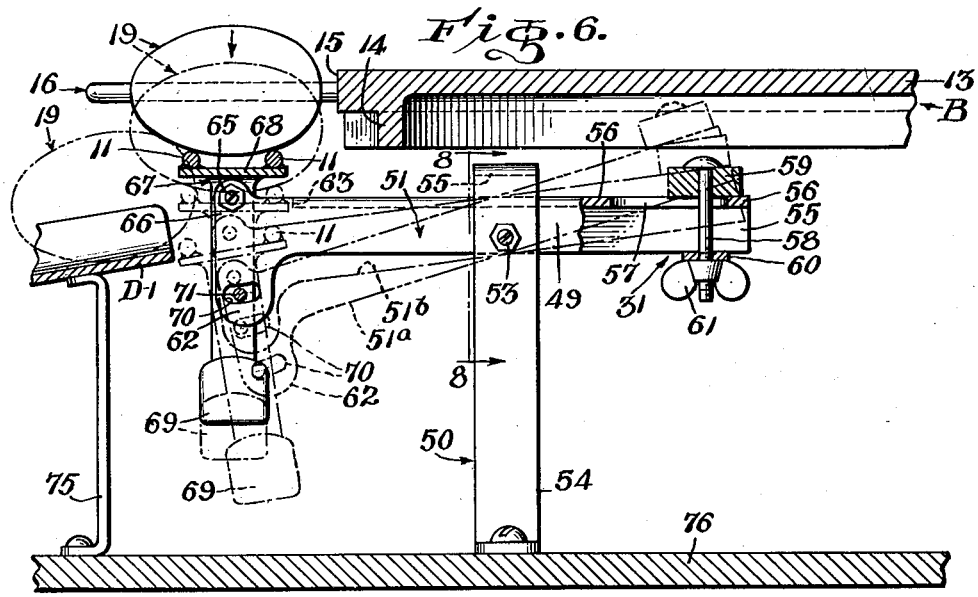
INVENTOR.
ORVAL PARKER
BY Sellers & Latta
Attorneys Patented Dec. 22, 1953

2,663,422

UNITED STATES PATENT OFFICE 2,663,422

EGG WEIGHING AND GRADING APPARATUS

Orval Parker, Canoga Park, Calif.

Application October 17, 1950, Serial No. 190,529

13 Claims. (Cl. 209—121)

This invention relates to apparatus for the grading of eggs for market, and has as its general object to provide an improved automatic apparatus for automatically separating a mixed run of eggs into a number of groups each containing eggs falling within a selected weight range, such as for example, groups classified as "small," "medium," "large," "undersize," and "jumbo."

One of the objects of the invention is to provide an egg grading apparatus embodying a rotating, wheel type conveyor for moving eggs on a concentric arcuate section of a track upon which the eggs may roll.

A further object is to provide such an egg grading apparatus utilizing an improved rotatable wheel type conveyor adapted to engage and move the eggs without danger of crushing them.

Another object is to provide an improved egg grading apparatus embodying the combination of a rotatable wheel type conveyor together with escapement mechanism for automatically feeding the eggs one at a time into the conveyor, said escapement mechanism being actuated at the rim of the conveyor wheel.

A further object is to provide an improved egg grading mechanism embodying a series of improved weighing units each adapted, under the weight of an egg falling within a weight class for which it is set, to first lower the egg without tilting it, until it has reached a level sufficiently low to clear the conveyor, and then to tilt so as to discharge the egg into a receiving hopper or chute.

Another object is to provide, in an egg grading apparatus, a weighing unit of extreme sensitivity.

In the drawings:

Fig. 3 is a detail sectional view, taken on the line 3—3 of Fig. 1, showing the escapement mechanism and its actuation by the conveyor;

Fig. 4 is a detail fragmentary plan view of the escapement mechanism and the actuating connection with the conveyor;

Fig. 5 is a detail view of the same taken as indicated by the line 5—5 of Fig. 4;

Fig. 6 is a detail sectional view showing one of the weighing units, taken as indicated by the line 6—6 of Fig. 1;

Fig. 7 is an end view of the weighing unit; and

Fig. 8 is a detail sectional view of the weighing unit taken on the line 8—8 of Fig. 6.

Figure 1:
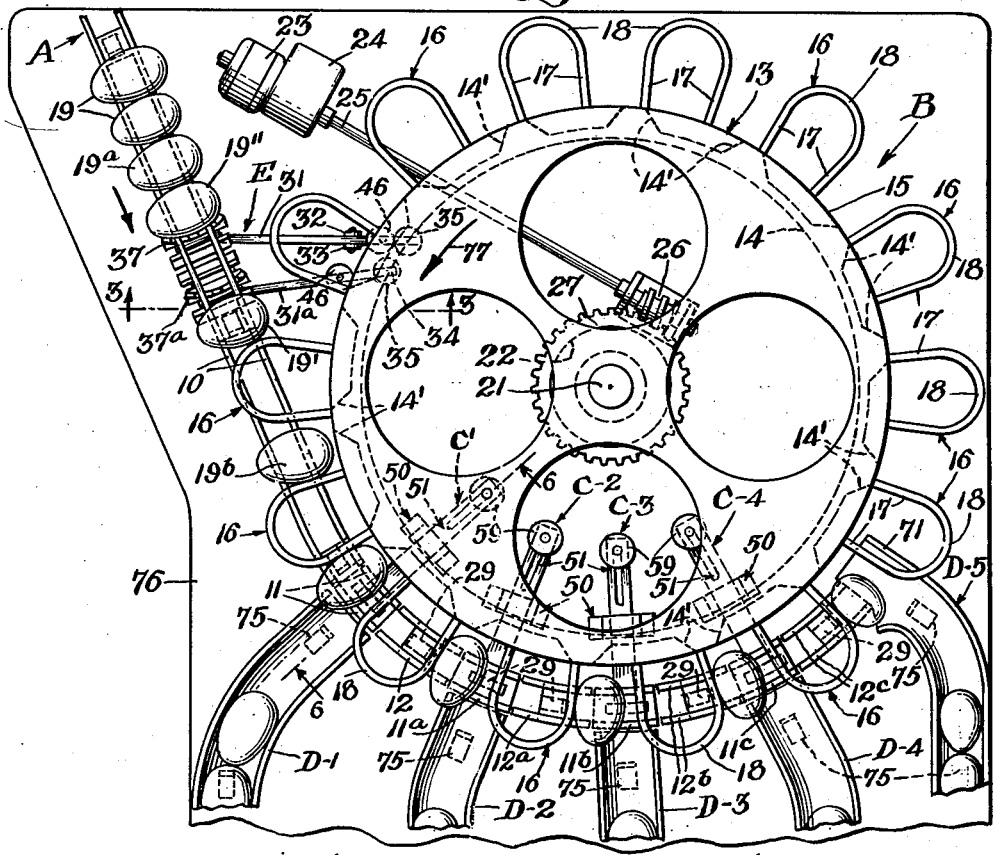
Fig. 1 is a plan view of an egg grading apparatus embodying the invention.

As an example of one form in which the invention may be embodied, I have shown in the drawings an egg grading apparatus comprising, in general, a track A, a conveyor wheel B, a series of weighing units C-1, C-2, C-3 and C-4, and a plurality of delivery chutes or the like D-1, D-2, D-3, D-4 and D-5 for conveying away from the machine, to appropriate receptacles, eggs of a series of classes ranging from maximum to minimum weight as, for example, "jumbo," "large," "medium," "small," and "undersize." The latter grade would of course be directed into bulk egg channels, and sold to bakeries or commercial egg packers or processors.

The track A includes a straight section 10, tangent to the periphery of the conveyor wheel B, and a series of short arcuate sections 11, 11a, 11b, and 11c each forming a portion of a corresponding weighing unit C-1, C-2, C-3, C-4; and another series of fixed arcuate sections 12, 12a, 12b, 12c, disposed in alternating relation to the sections 11, 11a, etc., end to end, so that the two groups of sections cooperatively define a length of track that is concentric with the axis of conveyor B. The fixed track sections 10, 12, 12a etc., may be supported on standards 29.

Conveyor B comprises a hub portion in the form of a flat circular disc 13 having a skirt flange 14 projecting downwardly therefrom and having a rim flange 15 projecting radially beyond the skirt flange 14. Skirt flange 14 is formed with a series of outwardly extending cam lobes 14', spaced at equal intervals around the circumference of the hub 13, the flange 14 providing a series of web sections between the respective cam lobes 14', which web sections function as the dwell portions of a circular cam having, as the rising portions thereof the lobes 14'.

The conveyor wheel B has a series of radially extending conveyor spokes or fingers 16 each in the form of a U-shaped loop of wire having radially disposed side arms 17 the inner ends of which are anchored in the flange 15 of hub 13. The conveyor B may be constructed by casting the ends of these arms into the hub 13, the latter being a casting of metal or a plastic molding, or the like.

The outer extremities of conveyor fingers 16 are in the form of semi-circular loops 18 which provide rounded surfaces adapted to engage the eggs 19 as they are fed along track 10, without any danger of breaking the shell or otherwise damaging the eggs.

Hub 13 is mounted, at its center, upon a rotatable supporting post 21, post 21 being journalled in a suitable bearing 22. Rotation is imparted to the conveyor B from a source of power such as a small electric motor 23 driving through a reduction gearing 24, a shaft 25, a worm 26 and a worm wheel 27, with the latter attached to supporting post 21.

An escapement mechanism E is located at a point where the straight portion 10 of track A approaches tangency with the conveyor B, where the eggs 19 just begin to come within the path of travel of the outer extremities of conveyor fingers 16. Track A is inclined downwardly from its outer end toward the point of tangency with conveyor B, at a degree of inclination sufficient to assure the rolling of eggs 19 along track without acquiring sufficient components of force compressively interacting between each other such as to tend to cause any egg to be lifted from the track. A satisfactory angle of inclination for this purpose is in the neighborhood of ten degrees.

The escapement mechanism E (Figs. 3-5) comprises a pair of rocking levers 31 and 31a respectively, each pivotally fulcrumed at 32 to a bracket 33 for vertical tilting movement in a plane extending generally transversely between the track A and the periphery of conveyor B. The inner end of each of the levers 31, 31a comprises a short arm 34 to which is secured a counterweight 35. To the outer end of these levers are pivoted at 36, escapement hands 37, 37a which project upwardly from pivots 36, each having at its upper end three claws including outer claws 38 and a central claw 39, the former arranged to straddle the rails of track section 10 and the latter arranged to extend upwardly between the rails. Each of the escapement hands 37, 37a is provided with an anti-friction roller 40 pivoted between the side portions of a central loop section of hand 37, said loop section defining an aperture 41 in which roller 40 is received. Rollers 40 are embraced between ways 42 and 42a, disposed in vertical, spaced, parallel relation, for guiding the escapement hands 37 in vertical movements.

Projecting upwardly from each of the levers 31, 31a, is an actuator arm 44 having at its upper end, connected thereto by a vertical pivot 45, a cam follower roller 46 which engages the skirt flange 14 and cam lobes 14' of the conveyor wheel B. The weight of counterweight 35 is in each instance so balanced against the effective weight of escapement hand 37 as to slightly overbalance the same and move the respective escapement hand upwardly to a raised position, except when opposed by the action of a cam lobe 14' engaging and outwardly moving a cam follower roller 46. This action transmits downward movement to a respective escapement hand 37 to withdraw the same to a position below the track section 10. The respective upper and lower limits of the hands are shown in Fig. 3, the hand 37 being shown in the raised position and the hand 37a in the lowered position.

The above described arrangement provides for automatic operation of the escapement hands 37, 37a, one of them moving upwardly while the other one moves downwardly.

It will now be apparent that when hand 37 is raised, hand 37a will be lowered to allow an egg formerly restrained thereby to roll into engagement with the rounded extremity of one of the conveyor fingers 16. Such egg is indicated at 19'. The raising of hand 37 has brought the same into restraining relation to the succeeding egg, which is indicated at 19", and the latter is restrained against further movement down the track section 10 until the positions of hands 37 and 37a have been reversed. Upon such reversal, the egg 19" will be allowed to advance one step into engagement with the hand 37a, now in the raised position. Upon the next reversal, the hand 37 will move upwardly between the egg 19", now resting against hand 37a, and the succeeding egg, which is indicated at 19a. As this occurs, hand 37 will be moving downwardly to release egg 19" so that the latter may roll the short distance down the track section 10 required to bring it into contact with one of the conveyor fingers 16.

Figure 2:
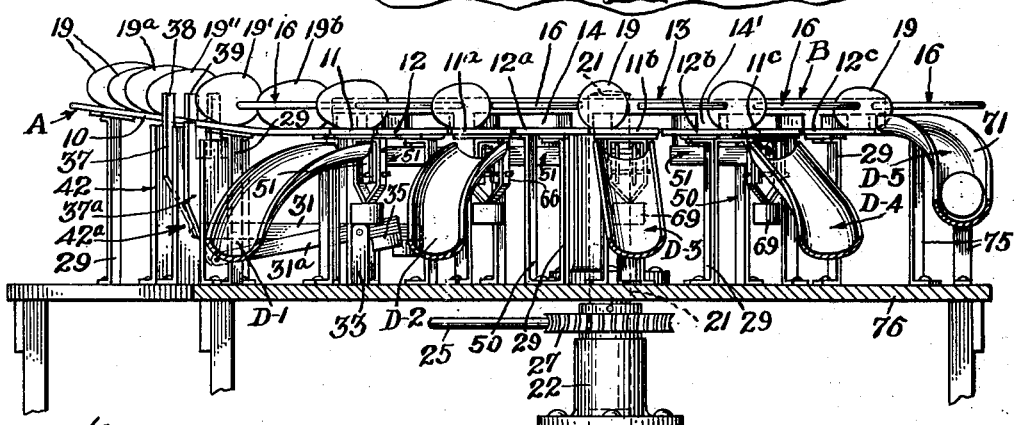
Fig. 2 is a side elevation thereof.

It may be noted that the hands 37 and 37a are so arranged that an egg moving into an engagement with conveyor finger 16 will be moving substantially in the direction of movement of said finger, with only a slight sliding action between the rounded tip of the finger and the face of the egg as the two progress toward the arcuate portion of the track. It may also be noted that the track 10 continues to be inclined downwardly until it reaches substantially the point where the egg indicated at 19b in Fig. 1, is substantially completely embraced between two adjacent conveyor fingers 16. At this point, the track becomes horizontal as indicated in Fig. 2, and the egg 19b, resting upon the horizontal portion of the track, will wait until it is overtaken by the finger 16 immediately behind it, before it moves any further. From that point on it will be moved along the track by the following flinger 16.

Referring now to the weighing units, which are disclosed in Figs. 6, 7 and 8, each of these units comprises a balance beam 51 having a fulcrum trunnion 52 the ends of which are pivoted upon needle point bearings 53. Needlepoint bearings 53 are mounted in the respective parallel vertical arms 54 of an inverted U-shape bracket 50 having a web portion 55 (Fig. 6) connecting the upper ends of said arms 54. Brackets 50 are disposed, in arcuate array, upon a common circumference, beneath that side of hub 13 which is adjacent the arcuate portion of the track A. The balance arms 51 are disposed radially with reference to the axis of rotation of conveyor wheel B. Balance arms 51 (Fig. 8) may be of channel section, including side flanges 49 in which the trunnion 52 is mounted, and including a web portion 56 connecting flanges 49. Web portion 56 has a longitudinal slot 57 (Fig. 6) through which is extended a bolt 58. Mounted on one end of bolt 58 is a weight 59. The other end of bolt 58 extends through a jaw 60 which is engaged by a wing nut 61 threaded onto bolt 58, jaw 60 being engageable with the edges of flanges 49 to clamp the weight 59 in any selected position for attaining the desired balance of arm 51.

The opposite end of each balance arm 51 comprises a pair of laterally spaced ears 62, between which the web 56 is terminated at the point indicated at 63 in Fig. 6. A trunnion 64 is mounted between the upper extremities of ears 62. The ends of the trunnion 64 are pivoted upon needlepoint bearings 65 which are mounted in the upper extremities of the side arms 66 of a yoke shaped hanger 67. Hanger 67 includes, at its upper extremity, a flat web portion 68 upon which the respective short rails of a track section 11, 11a, etc., are secured. The lower ends of arms 66 are brought together and joined to a counterweight 69 which functions to normally maintain the hanger 67 in a vertical position, with track section 11, 11a, etc., horizontal.

The ears 62 extend downwardly to define L-shaped extensions of balance beam 51, and are provided with registering slots 70 which are arcuately disposed and concentric to pivots 65. A pin 71 extending between the arms 66 and secured thereto, projects through slots 70.

Delivery chutes D-1, D-2, D-3, D-4 are disposed in positions inclined outwardly and downwardly from the arcuate portion of track A, with their upper ends closely associated with the respective movable track sections 11, 11a, 11b and 11c respectively. The height of the upper ends of these chutes D-1, etc., is such that the track sections 11, 11a, etc., will be level therewith in the lowermost positions of depression of track sections 11, 11a, etc., indicated in dotted lines in Fig. 6.

It will now be apparent that, with the weight 59 properly adjusted, the balance arm 51 may be caused to move downwardly at its outer end under the weight of an egg embraced within a selected range of weights. In so moving downwardly, the balance arm 51 will support the hanger 67 in a position which continues to depend vertically from pivots 65 until the outer extremities of slots 70 engage against pin 71. This will occur at the intermediate position indicated at 51b in Fig. 6. Thereafter, for the remainder of the downward movement of arm 51, hanger 67 will be forced to tilt so that its lower end moves inwardly, tilting track section 11, 11a outwardly until, when the track section arrives at its lowermost position level with the upper end of chute D-1, etc., there will be sufficient tilting to allow the egg to roll off the track section and into the chute.

Being balanced upon needle bearings, the balance arms 51 and hangers 67 are substantially free from friction and are therefore extremely sensitive in responding to slight differences in weight between different eggs. Accordingly, the apparatus will accurately function to divide the eggs into a series of groups graded according to weight, and to deliver the respective groups into any selected receptacle, through the chutes D-1, D-2, etc. It is to be noted that the last chute D-5 receives the eggs that are too light to depress any of the scales C-1, C-2, C-3, C-4. All eggs passing over the last scale C-4 will be automatically arrested and carried away by the chute D-5, the outer flange 71 of which blocks the path of movement of the egg around the track A. The bottom of the chute D-5 registers with the end of the last short arcuate fixed track section 12c, so that the egg may roll from the latter into the chute D-5.

Chutes D, D-1 etc., are supported on standards 75. Standards 29 and 75, brackets 33 and 55, and the bearing 22, may all be supported upon a common support which is indicated at 76.

It will now be apparent that the apparatus will operate automatically by the rotation of conveyor wheel B in the direction indicated by the arrow 77 in Fig. 1. The eggs, which may be fed onto the upper section 10 of track A, functioning as a hopper, will roll by gravity into interengagement with the fingers 16 of the conveyor wheel B, will be fed thereinto without jamming, by the escapement mechanism E, and will thereafter be carried around the arcuate portion of the track A by the fingers 16. As the eggs pass over the respective weighing units, they will be delivered out of the apparatus through the respective chutes D-1, D-2 in accordance with their respective weight classifications. The operation is therefore completely under the control of the rotation of conveyor wheel B, and the speed of operation may be adjusted simply by adjusting the speed of rotation of the conveyor wheel.

I am of course aware that the broad idea of a conveyor moving a series of eggs past a series of weighing units is not in itself novel, but my improvement thereon, wherein the eggs are fed by gravity down an inclined track to a horizontal arcuate track section whereon they are moved by a rotating wheel type conveyor into association with the respective weighing units, is an improved and simplified arrangement in contrast to prior arrangements and operates most satisfactorily, with less breakage of eggs and more accurate weighing than has hitherto been possible.

One of the primary improvements in operation is the functioning of the hands 37, 37a to align all of the eggs with their major axes at right angles to their path of movement along track A. This is accomplished by arranging the claws 38, 39 in an arcuate arrangement fitting the curvature of the side of an egg, whereby the movement of the egg against the first set of claws on hand 37, the shifting of the egg from that hand to the next hand and the engagement with the second set of claws, by the time the egg is delivered to the conveyor wheel, will assure the alignment of the egg in an exactly transverse relation to the track. Correspondingly, the eggs will roll truly about their longitudinal axes, with no wobbling movement, and will be handled properly in the apparatus whereas a wobbling movement would interfere with the handling of the eggs between the conveyor and the weighing units.

I claim:

1. In an egg grading apparatus, a weighing device comprising a standard, a balance arm pivoted to said standard on a horizontal axis for vertical tilting movement, a counterweight at the inner end of said balance arm, a hanger pivoted to the outer end of said balance arm, a cradle on the upper end of said hanger for supporting an egg passing thereover, a counterweight attached to the lower end of said hanger for normally maintaining it in an upright position, said cradle being disposed in a position to receive and retain an egg when said hanger is in said upright position, and a lost motion connection between said hanger and said balance arm providing for a limited amount of relative pivotal movement between said hanger and balance arm, whereby said balance arm may tilt said hanger downwardly while the hanger remains in a levelled position to hold the egg against rolling off of said egg supporting means, and adapted, near the lower extremity of movement of said balance arm, to engage said hanger and tilt the same to cause the egg to roll therefrom.

2. Apparatus as defined in claim 1, wherein said lost motion means comprises a pin mounted in said hanger, below the pivotal connection thereof with said balance arm, and a slot in said balance arm in which said pin is movable, with the pin adapted to engage an extremity of said slot to cause the tilting of the hanger as aforesaid.

3. In an egg grading apparatus, a sectional track along which an egg may roll, said sectional track including a plurality of short track sections, a conveyor including a series of conveyor elements for engaging the eggs and moving them in succession over said track sections and a series of weighing units each including a balance arm, a hanger pivoted to one end of said balance arm, the respective short track section being secured to the upper end of said hanger, said hanger including counter-balancing means for normally maintaining it in a position in which its track section is levelled to prevent an egg rolling therefrom, means for counterbalancing said arm against the weight of an egg supported upon said track section, and a lost motion connection between said hanger and said balance arm providing for a limited amount of relative pivotal movement between said hanger and balance arm, whereby said balance arm may move downwardly under the weight of an egg while said hanger remains horizontal, until the egg has been lowered to a position clearing said conveyor, and, toward the lower extremity of said downward movement, said hanger will be engaged and tilted so as to cause the egg to roll therefrom.

4. In an egg grading apparatus, an arcuate sectional track along which a series of eggs may roll; conveyor fingers at the periphery thereof, in circumferentially spaced relation, projecting over said track, for engaging a series of eggs and rolling them along said track, and a series of weighing units each including a short section of said track, a balance arm, means supporting said balance arm for pivotal movement in a vertical plane, a hanger pivoted to one end of said balance arm and carrying a respective track section at its upper end, said hanger having counterbalancing means for normally maintaining the track section carried thereby in a levelled position to prevent an egg rolling therefrom, means operating upon said balance arm to counterbalance the weight of an egg carried thereby, and a lost motion connection between said hanger and said balance arm providing for a limited amount of relative pivotal movement between said hanger and balance arm, for allowing the depression of said hanger from a position in which an egg supported thereon is engaged by a respective conveyor finger to a position below the plane of the conveyor finger so as to be cleared thereby, said lost motion connection including means for causing said hanger to tilt after said lowered position has been reached, whereby to deliver the egg off of the track section.

5. In an egg grading apparatus, a track including an inclined straight section and an arcuate section tangent thereto and extending in a horizontal plane from the lower end thereof; a conveyor wheel including a hub and a plurality of fingers projecting radially therefrom over said arcuate track section in the median horizontal plane of the eggs supported on said arcuate track section, said fingers each having its sides diverging radially outwardly and having a rounded tip margin tangent to said sides at the area of maximum width thereof; means mounting said conveyor wheel for rotation of said fingers in said median plane; a series of weighing units each including a short section of said arcuate portion of the track having a length slightly greater than the width of the eggs to be weighed, said weighing units operating to deliver the eggs out of the apparatus at positions corresponding to selected weight grades, said conveyor fingers each having a substantial width such that its trailing side will hold back the egg that is being moved by the following conveyor finger, so as to maintain adequate spacing between successive eggs to prevent two eggs simultaneously contacting a single one of said short track sections; means for rotating said conveyor, and means operating in timed relation to said rotating means to hold back a column of eggs on said inclined track section and to deliver said eggs one by one to said arcuate track section with each egg first contacting the rounded tip of a respective conveyor finger and sliding smoothly from said rounded tip into contact with the leading side of the respective finger as the egg travels from the inclined track section onto the arcuate track section.

6. In an egg grading apparatus, a track including an inclined section and an arcuate section extending in a horizontal plane the lower end thereof, said inclined section at its lower end being tangent to said arcuate section whereby to deliver eggs to said arcuate section by gravity rolling movement, a conveyor wheel rotatably mounted for movement in a horizontal plane and having a series of conveyor fingers projecting radially at the periphery thereof, over said arcuate track section, adapted to receive between said fingers the eggs delivered thereto by said gravity rolling movement at the lower end of said inclined track section, and a series of weighing units each including a short section of said arcuate portion of the track, adapted to weigh the eggs as they pass over said short track sections and to deliver them out of the apparatus in accordance with selected weight grades, said fingers projecting radially in the median horizontal plane of the eggs supported on said arcuate track section, and each having a substantial circumferential width such that the trailing edge of each conveyor finger will hold back the egg that is being moved by the following conveyor finger, so as to maintain adequate spacing between successive eggs to prevent two eggs simultaneously contacting a single one of said short track sections, said conveyor fingers being in the form of U-shaped loops of wire, and said conveyor including a hub in which the ends of the respective side arms of said loops are mounted, the extremities of said conveyor fingers being of rounded form to avoid damaging the eggs.

7. Apparatus as defined in claim 5, wherein said holdback and delivery means includes an escapement mechanism comprising a pair of arms mounted for vertical tilting movement and extending transversely between said conveyor wheel and said inclined portion of said track, vertically movable egg-restraining hands actuated by the outer ends of said escapement arms, for engagement with the eggs moving down said inclined track section, the inner ends of said arms having cam followers, and said conveyor wheel including a peripheral cam adapted to intermittently operate said cam followers so as to cause said escapement arms to oscillate vertically in timed relationship to each other, thereby to raise one of said hands while the other is lowered and vice versa in alternating succession, whereby said eggs are fed one by one between the conveyor fingers.

8. In an egg grading apparatus, a track including an inclined section down which a series of eggs may roll by gravity, and an arcuate section extending in a horizontal plane from the lower portion thereof; a conveyor wheel concentric with said arcuate track section, said conveyor wheel including a hub having a generally circular periphery formed with a series of cams and including an equal number of fingers projecting radially from said periphery over said arcuate track section in the horizontal median plane of the eggs rolling upon said arcuate track section; and a pair of escapement devices for controlling the movement of eggs from said inclined section onto said arcuate section in timed relation to the movement of said conveyor, with the eggs being fed successively into the spaces between succeeding adjacent pairs of fingers, one egg into each space, each escapement device comprising a T-shaped lever having inner and outer arms and an upwardly projecting intermediate arm and being fulcrumed at a point intermediate said inner and outer arms for movement in a vertical plane, an escapement hand pivoted to said outer arm, projecting upwardly, and having at its upper end means for engaging an egg moving on said inclined track section, a cam follower roller carried by said intermediate arm in a position to be successively engaged by said cams as the conveyor wheel rotates, for tilting said lever in a direction to move said escapement hand downwardly to an egg-releasing position, and means acting yieldingly downwardly on said inner arm to tilt said lever in the opposite direction so as to raise the respective escapement hand to a position blocking the path of rolling movement of an egg on said inclined track section, said levers being so spaced circumferentially of said conveyor wheel as to be actuated in opposite phase, with one escapement hand moving downwardly as the other moves upwardly, and vice versa.

9. Egg grading apparatus as defined in claim 8, wherein each of said hands is of arcuate shape, conforming to the curvature of the side of an egg whereby the engagement of the egg thereagainst will cause the longitudinal axis of the egg to be arranged transversely to the path of rolling movement on said track, thereby eliminating any wobbling movement in the rolling of the egg beyond said escape mechanism.

10. In an egg grading apparatus: a series of weighing units; a track including an inclined track section down which a series of eggs may roll by gravity toward said weighing units and including a stretch of sectional track extending horizontally from the lower end of said inclined track section, said stretch including short track sections each mounted on a respective weighing unit and movable downwardly under the weight of an egg for delivering a series of eggs from the apparatus in accordance with a selected weight grading; an endless conveyor including a horizontally movable peripheral portion having a series of conveyor fingers projecting horizontally therefrom, transversely to the path of movement thereof and movable in a path above said horizontally extending stretch of track, in the median horizontal plane of the eggs supported on the track, successive pairs of fingers being spaced so as to embrace between them an egg arranged with its longitudinal axis generally parallel to the fingers, and said peripheral conveyor portion having a series of cams disposed for movement in a horizontal path below the level of said fingers and inwardly thereof, said cams having a spacing corresponding to that of said fingers; and a pair of escapement devices for controlling the movement of eggs from said inclined section onto said arcuate section in timed relation to the movement of said conveyor, with the eggs being fed successively into the space between succeeding adjacent pairs of fingers, one egg into each space, each escapement device comprising a T-shaped lever having inner and outer arms and an upwardly projecting intermediate arm and being fulcrumed at a point intermediate said inner and outer arms, for movement in a vertical plane, an escapement hand pivoted to said outer arm, projecting upwardly, and having at its upper end means for engaging an egg moving on said inclined track section, a cam follower roller carried by said intermediate arm, in a position to be successively engaged by cams for tilting said lever in a direction to move said escapement hand downwardly to an egg-releasing position, and means acting yieldingly downwardly on said inner arm to tilt said lever in the opposite direction so as to raise the respective escapement hand to a position blocking the path of rolling movement of an egg on said inclined track section, said lever being so spaced circumferentially of said conveyor wheel as to be actuated in opposite phase, with one escapement hand moving downwardly as the other moves upwardly, and vice versa.

11. Egg grading apparatus as defined in claim 10 wherein said yieldingly downwardly acting means comprises counter-weights carried on said inner arms.

12. In an egg grading apparatus, a track including an inclined section down which a series of eggs may roll by gravity and a sectional arcuate stretch extending horizontally from the lower end thereof; a series of weighing units each including a short section of said horizontal stretch of track, adapted to move downwardly under the weight of an egg so as to deliver the egg from the apparatus in accordance with a selected weight grading; a conveyor wheel rotatably mounted concentric with said arcuate track section, said wheel including a hub and a plurality of fingers projecting radially therefrom over said arcuate track section in the median horizontal plane of the eggs supported on said arcuate track section, said fingers each having its sides diverging radially outwardly and having a rounded tip margin tangent to said sides at the area of maximum width thereof; said conveyor fingers each having a substantial width such that its trailing side will hold back the egg that is being moved by the following conveyor finger, so as to maintain adequate spacing between successive eggs to prevent two eggs simultaneously contacting a single one of said short track sections; means for rotating said conveyor; and means operating in timed relation to said rotating means to hold back a column of eggs on said inclined track section and to deliver said eggs one by one to said arcuate track section with each egg first contacting the rounded tip of a respective conveyor finger and sliding smoothly from said rounded tip into contact with the leading side of the respective finger as the egg travels from the inclined track section onto the arcuate track section.

13. Egg grading apparatus comprising a conveyor wheel having peripheral radially extending fingers, circumferentially spaced from each other, for engaging a series of eggs and moving them horizontally, a track including an inclined portion down which a series of eggs may roll by gravity, said inclined portion being tangent to the periphery of said conveyor at its lower end, and said track including a horizontal portion extending from the lower end of said inclined portion beneath the said conveyor fingers, said horizontal portion being arcuately curved in concentric relation to said conveyor wheel; and a series of weighing units each including a short movable section of said arcuate horizontal portion of said track, adapted, by depression thereof under the weight of an egg, to deliver the egg out of the apparatus in accordance with its respective egg classification; escapement mechanism actuated by the periphery of said conveyor wheel and cooperating with said inclined track section to restrain the downward movement of a column of eggs on the upper portion of said inclined track section and to feed the eggs from the lower extremity of said column, between the fingers of said conveyor wheel in timed relation, said escapement mechanism comprising a pair of escapement devices each including a T-shaped lever fulcrumed for oscillating movement in a vertical plane, each of said levers including an outer arm, an inner arm and an intermediate arm projecting upwardly, an escapement hand pivoted to the outer end of said outer arm and having at its upper extremity claws for passing upwardly between and around the rails of said track and engaging the eggs thereon, said conveyor wheel having a peripheral cam and said upwardly extending arm having a cam follower roller engageable with said peripheral cam for actuating said escapement device.

ORVAL PARKER.

References Cited in the file of this patent

UNITED STATES PATENTS

| Number | Name | Date |
|---|---|---|
| 1,246,463 | Price | Nov. 13, 1917 |
| 1,336,304 | Leumann | Apr. 6, 1920 |
| 1,355,999 | Nelson | Oct. 19, 1920 |
| 1,791,096 | Humphrey | Feb. 3, 1931 |
| 1,824,693 | Smith | Sept. 22, 1931 |
| 2,508,796 | Pekar | May 23, 1950 |

FOREIGN PATENTS

| Number | Country | Date |
|---|---|---|
| 585,304 | Germany | Oct. 2, 1933 |